(12) United States Patent
Yamane et al.

(10) Patent No.: US 7,179,868 B2
(45) Date of Patent: Feb. 20, 2007

(54) POLYGLYCOLIC ACID-BASED RESIN COMPOSITION AND SHAPED PRODUCT THEREOF

(75) Inventors: Kazuyuki Yamane, Fukushima-Ken (JP); Hiroyuki Sato, Fukushima-Ken (JP); Yukichika Kawakami, Fukushima-Ken (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 10/548,646

(22) PCT Filed: Mar. 19, 2004

(86) PCT No.: PCT/JP2004/003780

§ 371 (c)(1),
(2), (4) Date: Sep. 13, 2005

(87) PCT Pub. No.: WO2004/087813

PCT Pub. Date: Oct. 14, 2004

(65) Prior Publication Data

US 2006/0100392 A1    May 11, 2006

(30) Foreign Application Priority Data

Mar. 28, 2003   (JP) .............................. 2003-092436

(51) Int. Cl.
*C08L 67/04*  (2006.01)
*C08F 20/02*  (2006.01)

(52) U.S. Cl. ...................................... 525/437; 525/165

(58) Field of Classification Search ................ 525/165, 525/437
See application file for complete search history.

(56) References Cited

U.S. PATENT DOCUMENTS

| 4,424,242 | A | * | 1/1984 | Barbee | ..................... 428/36.6 |
| 4,565,851 | A | * | 1/1986 | Barbee | ..................... 525/437 |
| 4,729,927 | A | * | 3/1988 | Hirose et al. | ............... 428/480 |
| 6,951,956 | B2 | * | 10/2005 | Yamane et al. | ............. 562/587 |
| 6,951,965 | B2 | * | 10/2005 | Kimura | ..................... 568/724 |
| 7,067,611 | B2 | * | 6/2006 | Yamane et al. | ............. 528/354 |

FOREIGN PATENT DOCUMENTS

| JP | 10-291379 | 11/1998 |
| JP | 2002-226691 | 8/2002 |
| JP | 2003-171536 | 6/2003 |
| JP | 2003171536 A * | 6/2003 |

* cited by examiner

*Primary Examiner*—Randy Gulakowski
*Assistant Examiner*—Alicia M. Toscano
(74) *Attorney, Agent, or Firm*—Wenderoth, Lind & Ponack, L.L.P.

(57) ABSTRACT

A polyglycolic acid-based resin composition is formed by adding a relatively small amount of aromatic polyester resin to a polyglycolic acid resin. The thus-formed composition is provided with remarkably improved moisture resistance stability and hot-melt processability, and further improved stretchability, while retaining the excellent properties as represented by gas barrier property of the polyglycolic acid resin. As a result of stretching by utilizing the improved stretchability, a shaped product having an improved transparency can be obtained.

15 Claims, No Drawings

POLYGLYCOLIC ACID-BASED RESIN COMPOSITION AND SHAPED PRODUCT THEREOF

TECHNICAL FIELD

The present invention relates to a polyglycolic acid-based resin composition containing a polyglycolic acid resin as a major component and a relatively minor amount of aromatic polyester resin, and also a shaped product thereof.

BACKGROUND ART

Polyglycolic acid (PGA, including polyglycolide) has biodegratability and is also excellent in heat resistance, gas barrier property, rigidity (as a mechanical property for use as a packaging material), etc., so that the development of new use thereof as forming materials, such as various sheets, films and injection molding products has been envisaged (JP-A 10-60136, JP-A 10-80990, JP-A 10-138371, JP-A 10-337772). However, as polyglycolic acid resin has hydrolyzability, a composite forming material having improved properties together with another thermoplastic resin material is desired rather than the use thereof alone as a forming material.

On the other hand, aromatic polyester resins which are polycondensate products of aromatic dicarboxylic acids represented by (tere)phthalic acid and diols are excellent in transparency, rigidity and easy formability, and so-called "PET bottles" including polyethylene terephthalate that is a representative thereof as a representative material name are widely used as beverage bottles. Such a beverage bottle is required to have oxygen barrier property for preventing degradation of contents and carbon dioxide gas barrier property for preventing gasification of carbon dioxide dissolved under pressure in a foamable beverage so that an improved gas barrier property is desired.

Accordingly, several trials have been made to obtain a forming material using polyglycolic acid resin and excellent in mechanical properties and gas barrier property required of a packaging material, particularly a composite material suitable as a packaging or container-forming material, by compositing polyglycolic acid resin as described above with aromatic polyester resin by mixing or lamination.

For example, U.S. Pat. No. 4,424,242 to Barbee discloses a multilayer packaging material comprising a press-formed laminate of a polyglycolic acid film and a polyester terephthalate film. Further, U.S. Pat. No. 4,565,851 to Barbee discloses a polymer blend comprising polyglycolic acid and aromatic polyester resin in a weight-basis blend ratio of 50/50–5/95.

However, of the above-mentioned composite materials, the laminate is poor in melt processing characteristic and stretching property. On the other hand, as for the polymer blend, a material containing polyglycolic acid in excess of 25 wt. % is excluded from an object for evaluation by stretching. Further, both composite materials contain aromatic polyester resin as a major resin component and aim at improving the gas barrier property thereof with a relatively minor amount of polyglycolic acid resin, and therefore it is difficult to regard them as a material fully utilizing excellent properties of polyglycolic acid resin.

DISCLOSURE OF INVENTION

A principal object of the present invention is to provide a thermoplastic resin composition which comprises a polyglycolic acid resin as a major component, is improved in moisture resistance stability, stretchability and hot-melt processability and also has a good gas barrier property, and also a shaped product thereof. A further object of the present invention is to provide a polyglycolic acid-based resin composition improved in gas barrier property and transparency, and a shaped product thereof.

According to the present invention, there is provided a polyglycolic acid-based resin composition, comprising: more than 50 wt. % of a polyglycolic acid resin and less than 50 wt. % of an aromatic polyester resin.

The composition described in the above-mentioned U.S. Pat. No. 4,565,851 to Barbee is based on a concept of improving the gas barrier property of an aromatic polyester with a minor amount of polyglycolic acid, and a resin composition comprising a polyglycolic acid resin as a major component has not been considered. In contrast thereto, the present invention aims at improving the moisture resistance stability and hot-melt processability of a polyglycolic acid resin as a major component by the incorporation of a relatively minor amount of an aromatic polyester resin. The addition effect of such a minor amount of aromatic polyester resin on which the present invention is based is not attained by any one of polyamide, polyethylene and polylactic acid which were used as representatives of other thermoplastic resins (Examples 28–30 described hereinafter).

The reason why a thermoplastic resin composition like that of the present invention comprising a major amount (more than 50 wt. %) of polyglycolic acid resin and a minor amount (less than 50 wt. %) of aromatic polyester resin has not been practically used hitherto, has not been fully clarified as yet, but according to our study, it is assumed that the following factors have obstructed the practical use of such a polyglycolic acid-based resin composition. (a) Polyglycolic acid has a low thermal decomposition temperature of ca. 245° C., so that the hot-melt processing thereof in mixture with an aromatic polyester resin requiring a hot-melt processing temperature of 240–270° C. has been considered difficult. (b) A blend of a polyglycolic acid resin and an aromatic polyester resin does not form a complete hot-melt compatible system, and their refractive indices are different form each other, so that a shaped product of the blend becomes opaque, and it has been considered difficult to provide a transparency required of a packaging material. (For example, a shaped sheet of a 50:50 (wt.) blend of these resins exhibited a haze of 90%, representing a remarkably poor transparency as shown in Example 8 described later.) (c) A shaped product of a higher polyglycolic acid content has been considered to have a worse stretchability.

According to our further study, however, it has been found possible to improve the above-mentioned problem (a) of poor heat-stability of polyglycolic acid, at least by including an appropriate thermal stabilizer, and as a result thereof, the hot-melt processing thereof in mixture with an aromatic polyester resin is not obstructed thereby. It has been also found that the inclusion of a minor amount of aromatic polyester resin rather provides a significant improvement to the hot-melt processability and moisture resistance stability, and also the stretchability (c) of a polyglycolic acid resin as the major component. Further, the opacification problem (b) of a shaped product can be remarkably improved to provide a remarkably increased transparency, if the shaped product is stretched by utilizing the improved stretchability. This also increases the gas barrier property for a packaging material. The inclusion of a minor amount of aromatic polyester resin contributes to an improvement of the stretchability. Further, the above-mentioned improvement in transparency of a shaped product through stretchability is not recognized in the case of polyglycolic acid resin alone but is recognized only with the resin composition of the present invention including an aromatic polyester resin.

The polyglycolic acid-based resin composition and the shaped product thereof of the present invention are based on the above-mentioned findings of ours.

BEST MODE FOR PRACTICING THE INVENTION (Polyglycolic Acid Resin)

The polyglycolic acid resin (hereinafter sometimes referred to as the "PGA resin") constituting a major component of the polyglycolic acid-based resin composition (sometimes referred to as the "PGA composition") of the present invention may include a homopolymer of glycolic acid (including a ring-opening polymerization product of glycolide (GL) that is a bimolecular cyclic ester of glycolic acid) consisting only of glycolic acid-recurring unit represented by formula (I) below:

$$-\!\!\left(\mathrm{O}\!-\!\mathrm{CH}_2\!-\!\mathrm{CO}\right)\!\!-, \qquad (I)$$

and also a polyglycolic acid copolymer comprising at least 55 wt. % of the above-mentioned glycolic acid-recurring unit.

Examples of comonomer providing the polyglycolic acid copolymer together with a glycolic acid monomer, such as the above-mentioned glycolide, may include: cyclic monomers, such as ethylene oxalate (i.e., 1,4-dioxane-2,3-dione), lactides, lactones (e.g., β-propiolactone, β-butyrolactone, β-pivalolactone, γ-butyrolactone, δ-valerolactone, β-methyl-δ-valerolactone, and ε-caprolactone), carbonates (e.g., trimethylene carbonate), ethers (e.g., 1,3-dioxane), ether esters (e.g., dioxanone), amides (ε-caprolactam); hydroxycarboxylic acids, such as lactic acid, 3-hydroxypropanoic acid, 3-hydroxybutanoic acid, 4-hydroxybutanoic acid and 6-hydroxycaproic acid, and alkyl esters thereof; substantially equi-molar mixtures of aliphatic diols, such as ethylene glycol and 1,4-butanediol, with aliphatic dicarboxylic acids, such as succinic acid and adipic acid, or alkyl esters thereof; and combinations of two or more species of the above.

The content of the above-mentioned glycolic acid recurring unit in the PGA resin is at least 55 wt. %, preferably at least 70 wt. %, further preferably at least 90 wt. %. If the content is too small, the gas barrier property required of the PGA resin becomes insufficient. As far as the content is satisfied, the PGA resin can comprise two or more polyglycolic acid (co)polymers in combination.

The polyglycolic acid-based resin composition (PGA composition) of the present invention comprises the PGA resin in a major amount, i.e., a proportion in excess of 50 wt. %. The PGA resin content in the PGA composition is preferably 60–99 wt. %, more preferably 60–90 wt. %, further preferably 70–90 wt. %. As the PGA resin content becomes smaller, the gas barrier property—improving effect is decreased. On the other hand, in excess of 99 wt. %, the effects of improving the moisture resistance stability and hot-melt processability, and further the stretchability-improving effect, owing to the inclusion of the aromatic polyester resin, are decreased. It is preferred for the PGA composition of the present invention to contain the above-mentioned glycolic acid-recurring unit of the formula (I) above in a proportion of at least 50 wt. %, further preferably at least 70 wt. %.

The PGA resin may preferably have a weight-average molecular weight (based on polymethyl methacrylate) in a range of 50,000–600,000 according to GPC measurement using hexafluoroisopropanol solvent. If the weight-average molecular weight is too low, the melt mixing with the aromatic polyester resin becomes difficult to result in a lower strength of shaped product. If the weight-average molecular weight is too large, the melt mixing with aromatic polyester resin again becomes difficult and causes heat evolution due to shearing force exerted by the screw during the melt processing, thus promoting the coloration of resin during the processing of the PGA composition into pellets or into shaped products and further resulting in shaped products with irregularities (flow marks) due to insufficient melting and with a poor appearance. Weight-average molecular weights of ca. 150,000–300,000 are further preferred.

(Aromatic Polyester Resin)

The aromatic polyester resin as a second component of the PGA composition of the present invention is a polyester of which at least one of the constituents, i.e., a dicarboxylic acid and a diol, preferably the dicarboxylic acid, is an aromatic one. The aromatic dicarboxylic acid may preferably be terephthalic acid, isophthalic acid, naphthalene dicarboxylic acid, etc. The aromatic dicarboxylic acid can be copolymerized with an aromatic carboxylic acid compound having three or more carboxyl groups, or an aliphatic or alicyclic carboxylic acid compound having two or more carboxyl groups. On the other hand, examples of preferred diol component may include: ethylene glycol, propylene glycol, 1,4-butanediol, xylylene glycol, bisphenol A, diethylene glycol, 1,4-cyclonexane-dimethanol, 2-methyl-1,3-propanediol, and neopentyl glycol. It is further preferred to include a diol component having at most 6 carbon atoms. Particularly preferred examples of the aromatic polyester resin include: polyethylene terephthalate (PET), polybutylene terephthalate (PBT) and polytrimethylene terephthalate (PIT), and in addition thereto, it is also possible to suitably use a co-polyester (co-PET) of which at least one of the dicarboxylic acid and the diol components comprises two species of the component, e.g., a co-polyester that is a co-polycondensate of terephthalic acid as the dicarboxylic acid with ethylene glycol (60–75 mol %) and 1,4-cyclohexanedimethanol (25–40 mol %), and a co-polyester obtainable by replacing a portion, preferably at most ca. 15 mol %, of terephthalic acid in a polyester using the terephthalic acid as the dicarboxylic acid with another carboxylic acid, such as isophthalic acid or an aliphatic or alicyclic carboxylic acid compound having two or more carboxyl groups. An aromatic polyester or co-polyester containing a diol component of at most 6 carbon atoms can be combined with the PGA resin to improve and well retain the transparency and gas barrier property in combination.

The aromatic polyester resin may be used in the GPA composition in a proportion of at least 1 wt. % and less than 50 wt. %, preferably at most 40 wt. %, further preferably at most 30 wt. %. While an amount of 1 wt. % or more can provide the effects of improving the moisture resistance stability of the PGA composition and the stretchability of a product shaped from the composition, it is further preferred to include 10 wt. % or more thereof so as to further improve the moisture resistance stability and the stretchability. On the other hand, if contained in 50 wt. % or more, the oxygen gas permeability is increased compared with the case of the PGA resin alone, thus failing to achieve the effect of remarkable improvement in gas barrier property that is aimed at in the present invention by using the PGA resin as a major component. The required level of gas barrier property may be determined based on the intended use of the composition, but in order to retain a good gas barrier property, the proportion of the aromatic polyester resin in the PGA composition is preferably 40 wt. % or less and is preferably set so as to retain a PGA resin content of 90–70 wt. % in the PGA composition in order to satisfy the transparency and gas barrier property in combination.

Incidentally, the PGA composition of the present invention can include a recycled portion of the aromatic polyester resin (and the PGA resin), and the PGA resin, for example, can be additionally blended so as to retain the composition range of the PGA composition according to the present invention. Further, in the case of obtaining a colored shaped product, if a colorant is blended in advance with the PGA resin and/or the aromatic polyester resin, it is possible to easily obtain a colored shaped product of a desired density.

The aromatic polyester resin may preferably have an intrinsic viscosity (limiting viscosity, IV value in a range of 0.6–2.0 (dl/g) when measured in a phenol/tetrachloroethane (1/1) mixture solvent at 25° C. If the IV value is too low, it becomes difficult to shape the composition into a film, and the resultant film strength is liable to be lowered. If the IV value is too high, the shaped product is liable to be accompanied with a coloring of the resin due to evolution of shearing heat during the melt processing and irregularities due to insufficient resin melting. An IV value in a range of 0.7–1.5 is further preferred.

In the PGA composition of the present invention, it is preferred that the PGA resin and the aromatic polyester resin have close melt viscosities during the processing for the shaping. A preferred viscosity ratio is in a range of 1/10–10/1 so as to allow easy shaping.

(Another Thermoplastic Resin)

As described above, the PGA composition of the present invention contains the PGA resin in a proportion exceeding 50 wt. %, and the aromatic polyester resin in a proportion of 1 wt. or more, preferably 10 wt. % or more, thereby improving the moisture resistance stability and hot-melt processability of the PGA resin while retaining the advantage thereof of providing a shaped product with excellent gas barrier property, and further improving the stretchability and transparency of the shaped product. Accordingly, as far as being not contradictory with such purposes, another thermoplastic resin can be incorporated in the PGA composition of the present invention within an extent that the above-mentioned contents of the PGA resin and the aromatic polyester resin are satisfied. Examples of such another thermoplastic resin may include: homopolymers or copolymers of the above-mentioned comonomers for providing the polyglycolic acid copolymer, and co-polymers obtained by transesterification of PGA and aromatic polyesters.

(Thermal Stabilizer)

The PGA composition according to the present invention may preferably contain a thermal stabilizer. The thermal stabilizer may be selected from compounds functioning as anti-oxidants for polymers, and it is preferred to use at least one species of compounds selected from the group consisting of heavy metal-deactivating agents, and metal carbonate salts. Among these, phosphoric acid esters including a pentaerythrithol skeleton (or a cyclic neopentane-tetra-il structure) and represented by formula (II) below, phosphor compounds having at least one hydroxyl group and at least one long-chain alkyl ester group and represented by formula (III) below, are preferred, because they effectively provide a thermal stability-improving effect at a small addition amount.

Formula (II)

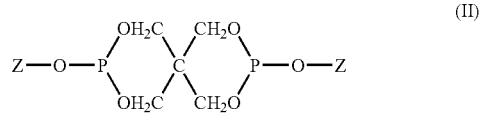

Z: alkyl group or aryl group

Formula (III)

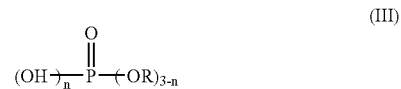

R: alkyl group

The mixing of the thermal stabilizer may be effected, e.g., by preliminary melt-mixing together in a pelletizing step of the PGA resin, melt-mixing with the aromatic polyester resin or melt-mixing in a step of forming a PGA composition from the PGA resin and the aromatic polyester resin. If the thermal stabilizer is melt-mixed preliminarily with the PGA resin, a small amount of the thermal stabilizing can effectively improve the thermal stability. This is because it is preferred to increase the stability of the PGA resin in advance of the hot melt mixing as the crystal melting point of the aromatic polyester resin is substantially higher than that of the PGA resin.

The thermal stabilizer may be incorporated in an amount of ordinarily 0.001–5 wt. parts, preferably 0.003–3 wt. parts, more preferably 0.005–1 wt. part, per 100 wt. parts of the PGA resin. The ordinary amount corresponds to ca. 0.0001–2.5 wt. parts per 100 wt. parts of the PGA composition. If the thermal stabilizer is added in an excessively large amount, it can impair the transparency while the addition effect thereof is saturated.

(Shaping)

The PGA composition of the present invention comprising the above-mentioned PGA resin and aromatic polyester resin and preferably containing a thermal stabilizer, has been improved in hot-melt processing properties, so that it can be easily formed and processed into various forms of shaped products, such as films, sheets, fiber, other extruded products, injection-molding products, and hollow shaped products. The films or sheets may generally be produced by melt-extruding pellets of the PGA composition through a flat die, such as a T-die, or a circular die. The films may preferably be in the form of stretched films or thermally shrinkable films. The sheets may be further formed into containers or vessels, such as trays and cups, by sheet forming techniques, such as vacuum forming or pressure forming. The hollow shaped products may include blown containers, and stretched-and-blown containers.

It is preferred that the shaped products of the present invention are stretched through a process, such as film stretching, vacuum or pressure forming, or stretch-blowing. A first reason therefor is that the PGA composition of the present invention in a shaped form is provided with an improved stretchability by inclusion of a relatively small amount of 1 wt. % or more of the aromatic polyester resin, and a second reason therefor is that the stretching of the shaped product by utilizing the thus-improved stretchability results in improved gas-barrier property and transparency which are desirable for packaging or container materials. The stretching ratio is preferably at least 2 times, more preferably ca. 3–4 times, in one direction, and ca. 9–16 times in terms of an areal ratio. If the stretching ratio is excessively large, e.g., in excess of 30 times, the gas-barrier property is liable to be rather lowered in some cases.

The shaped product of the present invention in any form inclusive of films, sheets and vessels, and may be in a form of a single-layered product but can be laminated with another resin layer or paper, etc. The laminate-formation processes may include: lamination processing, coating and co-extrusion. Dry processes such as aluminum vapor deposition can also be adopted.

Examples of the lamination processing may include: wet lamination, dry lamination, extrusion lamination, hot-melt lamination, and non-solvent lamination. The coating may be effected, e.g., as the formation of a moisture-proof coating or a moisture-proof lamination on a surface of a stretched film.

In the case of lamination by co-extrusion, it is preferred to form an intermediate layer of the composition of the present invention, and dispose another resin layer on both sides thereof. Between the respective layers, it is possible to dispose an adhesive layer as required. In case where the co-extrusion is followed by stretching, the whole laminate is stretched, so that a thermoplastic resin capable of easy stretching is selected as such another resin. Further, such another resin layer may be composed of, e.g., a sealable resin, or a resin excellent in impact resistance, abuse resistance or heat resistance (e.g., boiling resistance or retort resistance), depending on a required function thereof. Such another resin layer may respectively be formed of plural layers, as desired.

More specifically, examples of another thermoplastic resin forming a layer to be laminated with a layer of the PGA composition of the present invention may include: polyester resins, such as polyethylene terephthalate and polyethylene naphthalate; polyolefin resins, such as polyethylene; polystyrene resins; acrylic acid- or methacrylic acid-based resins; nylon resins; sulfide resins, such as polyphenylene sulfide; and polycarbonate resins. Among these, it is particularly preferred to use a polyester resin, particularly an aromatic polyester resin of which at least one of the diol component and the dicarboxylic acid component, preferably the dicarboxylic acid component, is an aromatic one, in order to provide a multi-layered shaped product having satisfactory transparency and gas barrier property, in combination, as required for the intended use thereof.

The shaped product of the present invention in any form inclusive of films, sheets and vessels, may have a thickness selected from a range of 5–1000 μm in consideration of strength, transparency and gas barrier property, depending on the intended use thereof.

In the case of a multi-layered shaped product, the PGA composition layer may preferably have a thickness of 3–90% of that of the whole shaped product. Below 3%, the contribution of the PGA composition layer for improving the gas barrier property of the shaped product is scarce, and in excess of 90%, it becomes difficult to retain the transparency of the shaped product in some cases.

EXAMPLES

Hereinbelow, the present invention will be described more specifically based on Examples and Comparative Examples. For the evaluation, the following measurement were performed.

The thickness structure of a film or sheet was measured by using "Layer Gauge II", made by Topwave K.K.

The stretchability was judged as "A" where the lowering in transparency hardly occurred, and as "C" where the lowering in transparency occurred, respectively as a result of stretching of a shaped product. This is because a lowering in transparency occurs in case of a poor stretchability.

Moisture resistance stability was evaluated based on the occurrence or non-occurrence of cracks as results of storage for 6 hours and 12 hours, respectively, under the conditions of 80° C. and a relative humidity of 95%. More specifically, judged as "A" where no cracks occurred after 12 hours; judged as "B" where cracks occurred after 12 hours but did not occur after 6 hours; and judged as "C" where cracks occurred after 6 hours.

The transparency in terms of haze (%) was measure by using "Haze Meter" made by Tokyo Denshoku K.K. after applying glycerin on a sample surface so as to remove the influence of the sample surface. A smaller haze (%) represents a better transparency.

The oxygen gas barrier property was measured by using "OX-TRAN100" made by Mocon Co. under the condition of 23° C. and a relative humidity of 80%. An oxygen gas permeation rate was measured in the unit of $cc/m^2/day/atm$ at a standardized thickness of 20 μm.

(Preparation of PGA Compositions)

PGA (made by Kureha Kagaku Kogyo K.K.; a melt viscosity=920 Pa·s as measured at 270° C. and a shear rate of 121/s) stabilized with 0.1 wt. part of a thermal stabilizer (made by Asahi Denka K.K.; cyclic neopentane-tetrail-bis (octadecyl) phosphite, a phosphoric acid ester represented by the above-mentioned formula (II)) per 100 wt. parts of the PGA, was blended with copolymerized PET (hereinafter referred to as "co-PET"; "PET-DA5", made by Kanebo Gosei K.K.); the composition: terephthalic acid/dimer acid/ethylene glycol=95/5/100 (mol/mol/mol) copolymer; IV=0.74), in proportions, respectively shown in Table 1 below. The blends were respectively melt-processed through a 20 mm-dia. twin-screw extruder (cylinder temperatures: 240–270° C., with a temperature distribution of C1/C2/C3/D=240/250/270/250° C.) to form pellets Pe1 to Pe9 (of which Pe2–Pe7 were compositions of Examples, and the others were compositions of Comparative Examples). All the pellets were milky white in appearance.

TABLE 1

| Resin compn. | Pellets of PGA composition | | | | | | | | |
|---|---|---|---|---|---|---|---|---|---|
| | Pe1 | Pe2 | Pe3 | Pe4 | Pe5 | Pe6 | Pe7 | Pe8 | Pe9 |
| PGA (wt. %) | 100 | 99 | 95 | 90 | 80 | 70 | 60 | 50 | 0 |
| co-PET (wt. %) | 0 | 1 | 5 | 10 | 20 | 30 | 40 | 50 | 100 |

The above-mentioned pellets (Pe1–Pe9) were subjected to comparative tests (Ex. 1–Ex. 26) as described below.

Ex. 1–Ex. 9

A multi-layer sheet-forming (T-die) apparatus to which three 40 mm-dia. extruders were connected, was used to form a three-layered multi-layer sheet (having thicknesses of inner layer/core layer/outer layer=ca. 100 μm/100 μm/100 μm) by forming a core layer of each pellet (Pe1–Pe9) and disposing layers of PET("9921W", made by Eastman Co.; IV=0.80, a melt-viscosity of 620 Pa·s as measured at 270° C. and a shear rate of 121/s) as inner and outer layers. The haze (%) values of the respective multi-layer sheets were measured. Outlines of the respective tests are shown as Ex. 1–Ex. 9 in Table 2 below.

TABLE 2

Multi-layer sheets

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Core layer resin compn. | Pe1 | Pe2 | Pe3 | Pe4 | Pe5 | Pe6 | Pe7 | Pe8 | Pe9 |
| Component ratio (wt. %) PGA/co-PET | 100/0 | 99/1 | 95/5 | 90/10 | 80/20 | 70/30 | 60/40 | 50/50 | 0/100 |
| Haze (%) | 2 | 5 | 10 | 14 | 50 | 80 | 90 | 90 | 3 |

Ex. 10–Ex. 18

Each of the multi-layer sheets obtained in Ex. 1–Ex. 9 was heated for 10–20 sec. at 120° C. and then subjected to simultaneous biaxial stretching at longitudinal×transverse ratios of ca. 4×4 times (an areal (or thickness)ratio of 14–18 times), thereby forming multi-layer stretched films (Ex. 10–Ex. 18) which exhibited measurement results shown in Table 3 below:

TABLE 3

Multi-layer stretched films

| | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Core layer resin compn. | Pe1 | Pe2 | Pe3 | Pe4 | Pe5 | Pe6 | Pe7 | Pe8 | Pe9 |
| Component ratio (wt. %) PGA/co-PET | 100/0 | 99/1 | 95/5 | 90/10 | 80/20 | 70/30 | 60/40 | 50/50 | 0/100 |
| Thickness (μm) | 21 | 21 | 21 | 22 | 22 | 21 | 18 | 17 | 20 |
| Stretch ratio (areal) | 15 | 14 | 14 | 14 | 15 | 15 | 18 | 18 | 15 |
| Stretchability | B | A | A | A | A | A | A | A | A |
| Moisture resistance stability | C | B | B | A | A | A | A | A | A |
| Haze | 14 | 6 | 5 | 4 | 4 | 5 | 5 | 3 | 3 |
| Oxygen gas permeability* | 1.4 | 1 | 1 | 2.2 | 1 | 2.3 | 5.1 | 7.4 | 52 |

*(20 μm; cc/m²/day/atm)

Ex. 19–Ex. 22

Among the pellets shown in Table 1, the pellet Pe 6 (PGA/co-PET=70/30 (wt. %)) was used and melt-formed at 250° C. to form a 100 μm-thick press sheet which exhibited a haze (%) of 80% similarly as shown in Table 2.

The press sheet was heated for 10–20 sec. at 120° C. and simultaneously biaxially stretched (except for Ex. 19) to form stretched films (of a single layer, Ex. 19–Ex. 22) which exhibited measured results shown in Table 4 below:

TABLE 4

Stretched films

| | Ex. 19 | Ex. 20 | Ex. 21 | Ex. 27 |
|---|---|---|---|---|
| Stretch ratio (Areal ratio) | 1 × 1 (1) | 2 × 2 (4) | 3 × 3 (9) | 4 × 4 (16) |
| Thickness (μm) | 100 | 25 | 11 | 6 |
| Haze (%) | 80 | 26 | 7 | 5 |
| Oxygen gas permeability* | 1.7 | 1.3 | 1.5 | 1.3 |

*(20 μm; cc/m²/day/atm)

Ex. 23–Ex. 26

Multi-layer stretch films were formed by using the pellet Pe 6 (PGA/co-PET=70–30 (wt. %)) in similar manners as in Ex. 15 except for changing the stretching ratios to form multi-layer stretched films (Ex. 23–Ex. 26) which exhibited measured results shown in Table 5 below:

TABLE 5

Multi-layer stretched films

| | Ex. 23 | Ex. 24 | Ex. 25 | Ex. 26 |
|---|---|---|---|---|
| Stretch ratio (Areal ratio) | 1 × 1 (1) | 2 × 2 (4) | 3 × 3 (9) | 4 × 4 (16) |
| Thickness (μm) | 310 | 85 | 38 | 21 |
| Haze (%) | 80 | 27 | 6 | 5 |
| Oxygen gas permeability* | 3.3 | 2.7 | 2.5 | 2.3 |

*(20 μm; cc/m²/day/atm)

Ex. 27

A PGA composition comprising 70 wt. % of PGA (made by Kureha Kagaku Kogyo K.K.; a melt-viscosity=820 Pa·s as measured at 270° C. and a shear rate of 121/s) stabilized with 0.05 wt. part of the same stabilizer as in Pe1 per 100 wt. parts of the PGA and 30 wt. % of polyethylene terephthalate (PET) ("9921W", made by Eastman Co.; IV=0.80) was melt-processed through a 20 mm-dia. twin-screw extruded cylinder temperatures: 240–280° C.) to form a pellet product.

A multi-layer sheet-forming (T-die) apparatus to which three 40 mm-dia. Extruders were connected, was used to form a three-layered multi-layer sheet (having thicknesses of inner layer/core layer/outer layer=ca. 100 μm/100 μm/100 μm) by forming a core layer of the above-prepared pellet composition and disposing layers of PET("9921W", made by Eastman Co.; IV=0.80) as inner and outer layers.

The thus-obtained multi-layer sheet was heated for 10–20 sec. at 120° C. and simultaneously biaxially stretched at longitudinal×transverse ratios of ca. 4×4 (14–18 times as an areal ratio) to form a 22 μm-thick stretched film. The multi-layer sheet exhibited a haze (%) of 70%, and the resultant multi-layer stretched film exhibited measured results shown in Table 6 below:

TABLE 6

Multi-layer stretched film

|  | Ex. 27 |
|---|---|
| Stretch ratio (Areal ratio) | 4 × 4 (14) |
| Thickness (μm) | 22 |
| Haze (%) | 4 |
| Oxygen gas permeability* | 2.3 |

*(20 μm; cc/m²/day/atm)

Ex. 28

The same blend as for providing Pe6 in Table 1 except for using polyamide Ny 6 ("AMILAN CM1021F", made by Toray K.K.) instead of the co-PET was melt-kneaded through a 20 mm-dia. small twin-screw extruder (cylinder temperature distribution: C1/C2/C3/D=240/250/270/250° C.), whereby black matter occurred and foaming was observed. Accordingly, the formation of a multi-layer sheet was not tried.

Ex. 29

The same blend as for providing Pe6 in Table 1 except for using low-density polyethylene ("NOVATEC LD", made by Nippon Polychem K.K.) instead of the co-PET was melt-kneaded through a 20 mm-dia. small twin-screw extruder (cylinder temperature distribution: C1/C2/C3/D=240/250/270/250° C.), whereas the two resins failed to exhibit a melt-kneaded state. Accordingly, instead of being melt-extruded, the blend was pressed under heat-melting at 250° C. and quenched to form a sheet, which exhibited a mottled appearance. The formation of a film was not tried.

Ex. 30

The same blend as for providing Pe6 in Table 1 except for using polylactic acid ("LACTY#9030", made by K.K. Shimadzu Seisakusho) instead of the co-PET was melt-kneaded through a 20 mm-dia. Small twin-screw extruder (cylinder temperature distribution: C1/C2/C3/D=240/250/270/250° C.), whereas the melt-kneaded resin caused a remarkable viscosity lowering so that the processing thereof through a pelletizer was impossible to fail in preparation of pellets. Accordingly, the cylinder temperatures of the kneading were lowered to C1/C$_2$/C3/D=240/250/250/250° C., whereas the pelletization was still similarly failed. As a result, the resin mixture (mass) was pulverized and then pressed under heat-melting at 250° C., followed by quenching to form a sheet, whereas the resultant sheet-like product was brittle and a complete-sheet formation was failed. The sheet-like product was brownish and turbid in appearance.

From the results shown in Tables 1 to 6, particularly in Table 3, it is understood that the inclusion of 1–40 wt. % of aromatic polyester resin with respect to 99–60 wt. % of PGA has remarkably improved the moisture resistance stability and stretchability of PGA while retaining the physical properties represented by the gas barrier property of PGA. Further, as is understood from a comparison of the results shown in Tables 2 and 3, as a result of stretching by utilizing the improved stretchability obtained by inclusion of aromatic polyester resin, it becomes possible to increase the gas barrier property to some extent and remarkably increase the transparency. Further, from a comparison with the results of Ex. 28 to Ex. 30, the above-mentioned improvements in thermal stability and hot-melt processability attained by the inclusion of an aromatic polyester resin according to the present invention are not obtainable by inclusion of polyamide, polyethylene or polylactic acid.

INDUSTRIAL APPLICABILITY

As described above, according to the present invention, it becomes possible to provide a PGA composition having remarkably improved moisture resistance stability and hot-melt processability, and further improved stretchability and transparency, while retaining the excellent properties as represented by the gas barrier property of a PGA resin, by incorporating a relatively minor amount of aromatic polyester resin to the PGA resin, and also a shaped product of the composition.

The invention claimed is:

1. A polyglycolic acid-based resin composition, comprising: 99 to 60 wt. % of a polyglycolic acid resin and 1 to 40 wt. % of an aromatic polyester resin.

2. A resin composition according to claim 1, comprising 90–70 wt. % of the polyglycolic acid resin and 10–30 wt. % of the aromatic polyester resin.

3. A resin composition according to claim 1, containing a thermal stabilizer of the polyglycolic acid resin.

4. A resin composition according to claim 3, wherein the thermal stabilizer is at least one compound selected from the group consisting of heavy metal-deactivating agents, phosphoric acid esters including a pentaerythritol skeleton, phosphor compounds having at least one hydroxyl group and at least one alkyl ester group, and metal carbonate salts.

5. A resin composition according claim 3, including the polyglycolic acid resin preliminarily melt-mixed with the thermal stabilizer.

6. A resin composition according to claim 1, wherein the aromatic polyester resin is an aromatic polyester copolymer.

7. A shaped product comprising a polyglycolic acid-based resin composition according to claim 1.

8. A shaped product according to claim 7, having a multi-layer structure.

9. A shaped product according to claim 7, having a form of film.

10. A shaped product according to claim 9, having a multi-layer structure including at least one stretched layer.

11. A shaped product according to claim 10, including two or more co-extruded layers.

12. A shaped product according to claim 10, wherein the stretched layer has been stretched at a stretching ratio of at least 2 times in at least one direction.

13. A shaped product according to claim 12, wherein the stretched layer has been stretched at an weal stretching ratio of at least 4 times.

14. A shaped product according to claim 12, wherein the stretched layer has been stretched at a stretching ratio of ca. 3–4 times in at least one direction.

15. A shaped product according to claim 13, wherein the stretched layer has been stretched at an weal stretching ratio of ca. 9–16 times.

* * * * *